(12) United States Patent
Tamate

(10) Patent No.: US 11,381,320 B2
(45) Date of Patent: Jul. 5, 2022

(54) OPTICAL TRANSMISSION SYSTEM

(71) Applicant: KYOCERA CORPORATION, Kyoto (JP)

(72) Inventor: Shuichi Tamate, Hino (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/442,121

(22) PCT Filed: Aug. 20, 2020

(86) PCT No.: PCT/JP2020/031397
§ 371 (c)(1),
(2) Date: Sep. 22, 2021

(87) PCT Pub. No.: WO2021/075146
PCT Pub. Date: Apr. 22, 2021

(65) Prior Publication Data
US 2022/0094444 A1    Mar. 24, 2022

(30) Foreign Application Priority Data
Oct. 18, 2019  (JP) .............................. JP2019-190638

(51) Int. Cl.
*H04J 14/02* (2006.01)
*H04B 10/80* (2013.01)
*H04B 10/50* (2013.01)

(52) U.S. Cl.
CPC ........... *H04B 10/80* (2013.01); *H04B 10/503* (2013.01); *H04J 14/0221* (2013.01)

(58) Field of Classification Search
CPC ...... H04B 10/80; H04B 10/503; H04B 10/40; H04B 10/50; H04B 10/60; H04B 10/807;
(Continued)

(56) References Cited

U.S. PATENT DOCUMENTS

2003/0147585 A1*  8/2003  Kikuchi .............. H04J 14/0201
                                                385/24
2014/0291895 A1* 10/2014  Kanade ................ G02B 6/0041
                                                264/437

FOREIGN PATENT DOCUMENTS

CN    108352920 A    7/2018
JP    2002300110 A   10/2002
(Continued)

OTHER PUBLICATIONS

Sleiffer et al., "Mode-division-multiplexed 3x112-GB/s DP-QPSK transmission over 80-km few-mode fiber with inline MM-EDFA and Blind DSP", ECOC Technical Digest, 2012, 4pp.

*Primary Examiner* — Hibret A Woldekidan
(74) *Attorney, Agent, or Firm* — Hauptman Ham, LLP

(57) ABSTRACT

An optical transmission system includes light supply devices, light receiving devices, an optical fiber cable, an electric power combiner and a data processing unit. MIMO communication is performed by the light receiving devices receiving signal beams having signals different from one another, output from the light supply devices and transmitted through a single core or cladding of the optical fiber cable. The signal beams are feed beams. The light supply devices output the feed beams with signals different from one another superimposed thereon by modulation. The light receiving devices convert the feed beams transmitted thereto into electric powers. The electric power combiner combines the electric powers obtained by the conversion. The data processing unit obtains signals superimposed on the feed beams received by the light receiving devices, and based on the obtained signals, obtains the signals superimposed by the light supply devices on the feed beams.

4 Claims, 7 Drawing Sheets

(58) Field of Classification Search
CPC . H04B 10/808; H04B 10/806; H04J 14/0221; H04J 14/02; H04J 14/00; G02B 6/2938
USPC ....... 398/68, 79, 140, 141, 182, 183, 94, 38, 398/135, 202
See application file for complete search history.

(56) References Cited

FOREIGN PATENT DOCUMENTS

| | | |
|---|---|---|
| JP | 2005198396 A | 7/2005 |
| JP | 2010135989 A | 6/2010 |
| JP | 2012160782 A | 8/2012 |
| JP | 2019140595 A | 8/2019 |

* cited by examiner

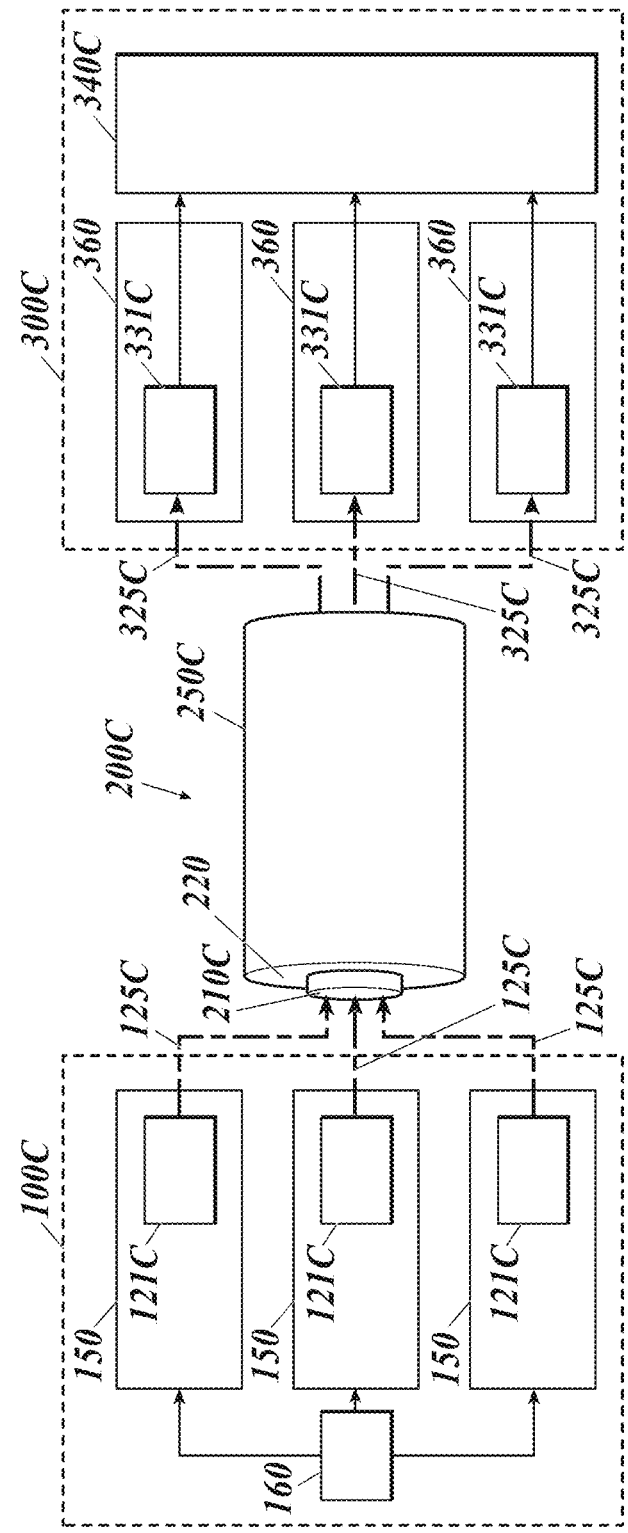

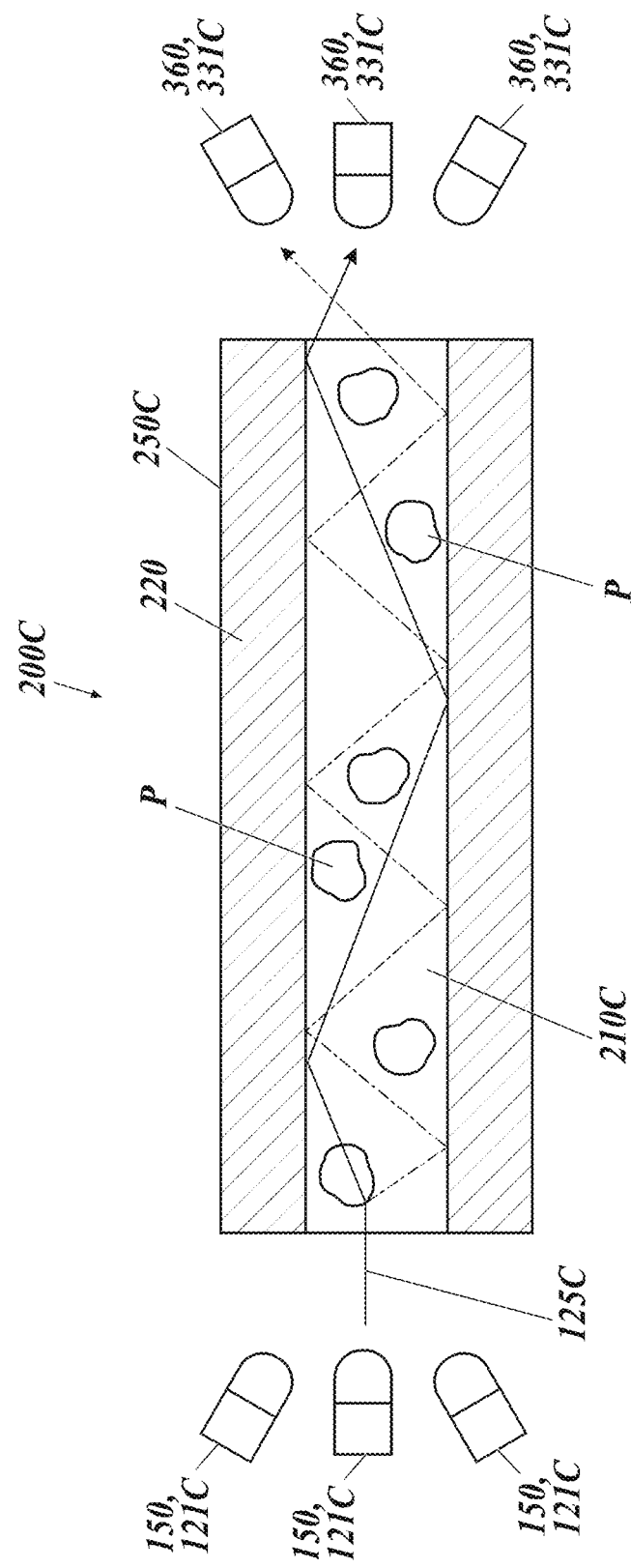

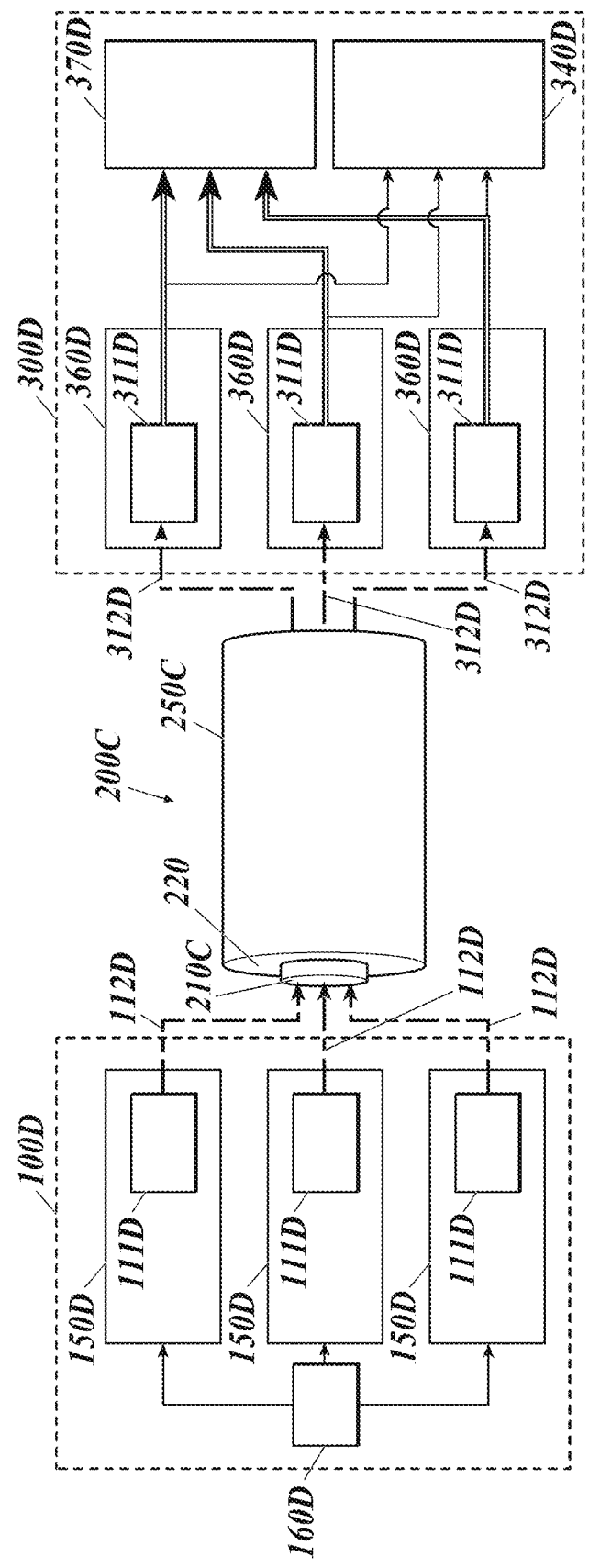

OPTICAL TRANSMISSION SYSTEM

RELATED APPLICATIONS

The present application is a National Phase of International Application Number PCT/JP2020/031397 filed Aug. 20, 2020 and claims priority to Japanese Application Number 2019-190638 filed Oct. 18, 2019.

TECHNICAL FIELD

The present disclosure relates to optical transmission.

BACKGROUND ART

Recently, there has been studied an optical transmission system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In an optical transmission system, further improvement of communication speed is required.

Solution to Problem

An optical transmission system according to an aspect of the present disclosure is an optical transmission system including:

a plurality of light supply devices that output signal beams;

a plurality of light receiving devices that receive the signal beams; and an optical fiber cable that transmits the signal beams, wherein MIMO communication is performed by the light receiving devices receiving the signal beams having signals different from one another, the signal beams being output from the light supply devices and transmitted through a single core or cladding of the optical fiber cable.

BRIEF DESCRIPTION OF DRAWINGS

FIG. 5 is a block diagram of an optical fiber transmission system according to a third embodiment of the present disclosure.

FIG. 6 is a schematic view to explain an optical fiber cable of the optical fiber transmission system according to the third embodiment of the present disclosure.

FIG. 7 is a block diagram of an optical fiber transmission system according to a fourth embodiment of the present disclosure.

DESCRIPTION OF EMBODIMENTS

Hereinafter, embodiments of the present disclosure will be described with reference to the drawings.

First Embodiment

Figure 1:
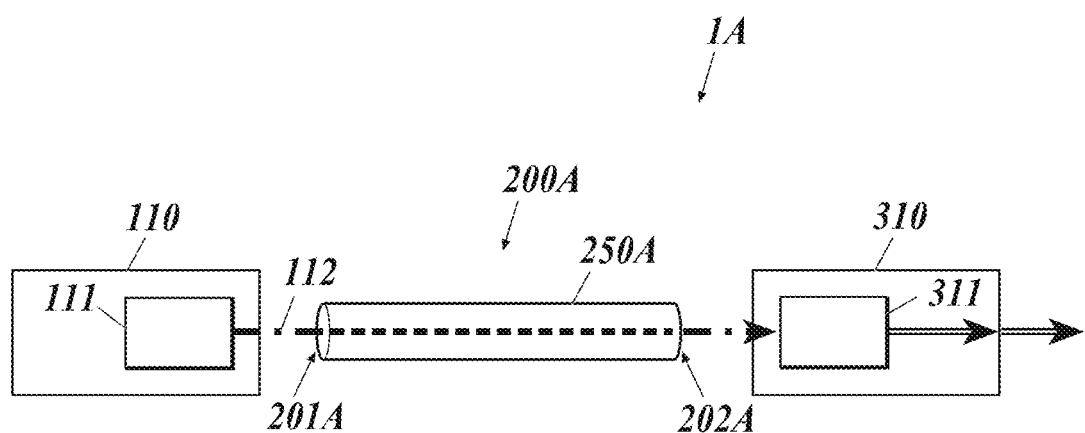
FIG. 1 is a block diagram of an optical fiber transmission system according to a first embodiment of the present disclosure.

As shown in FIG. 1, an optical fiber transmission system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light (laser beams) having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
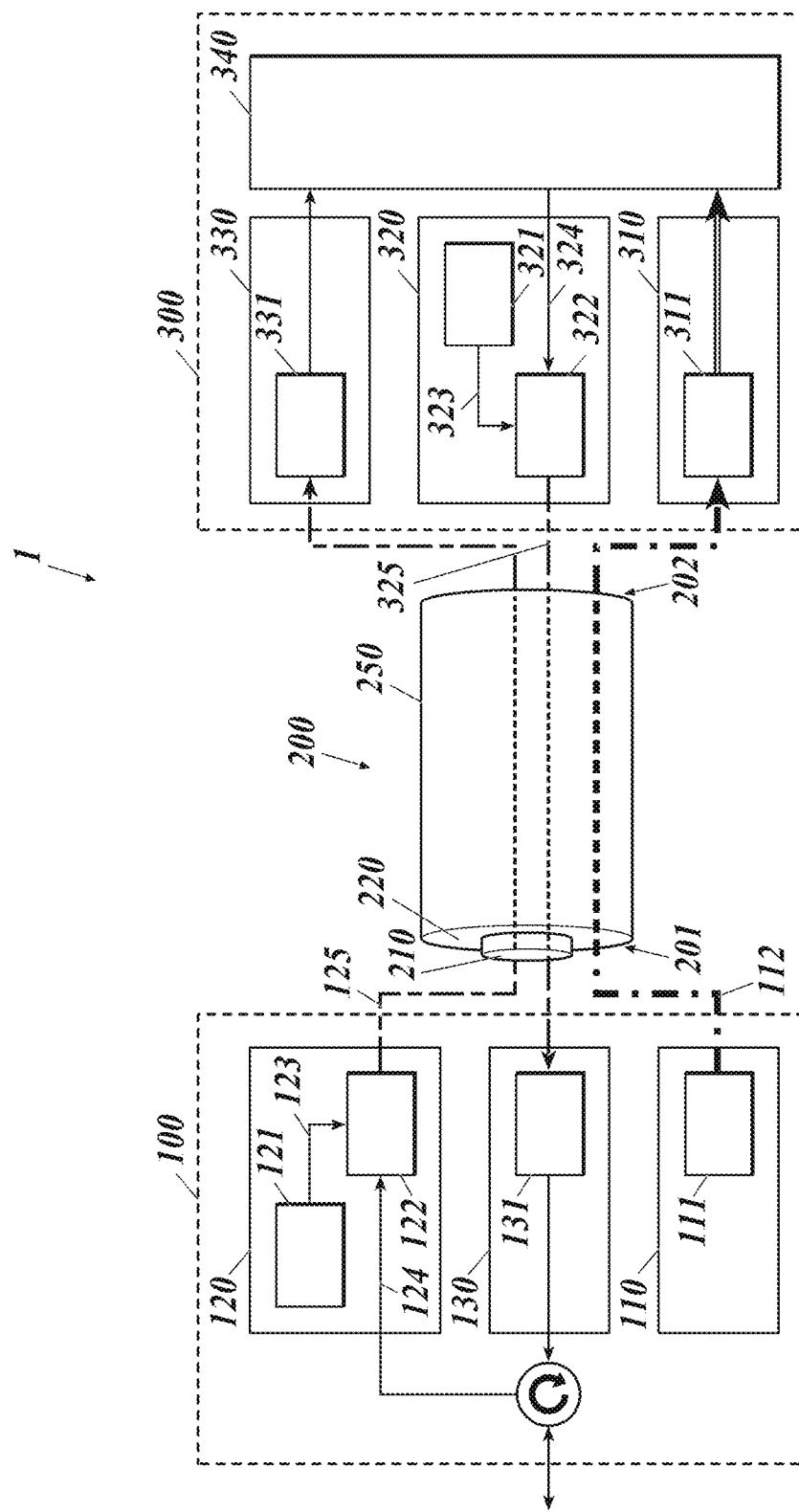
FIG. 2 is a block diagram of an optical fiber transmission system according to a second embodiment of the present disclosure.

As shown in FIG. 2, an optical fiber transmission system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light (signal beams); and a cladding 220 that is arranged so as to surround the core 210 and forms a transmission path of feed light (feed beams).

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a power supply network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a power supply network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
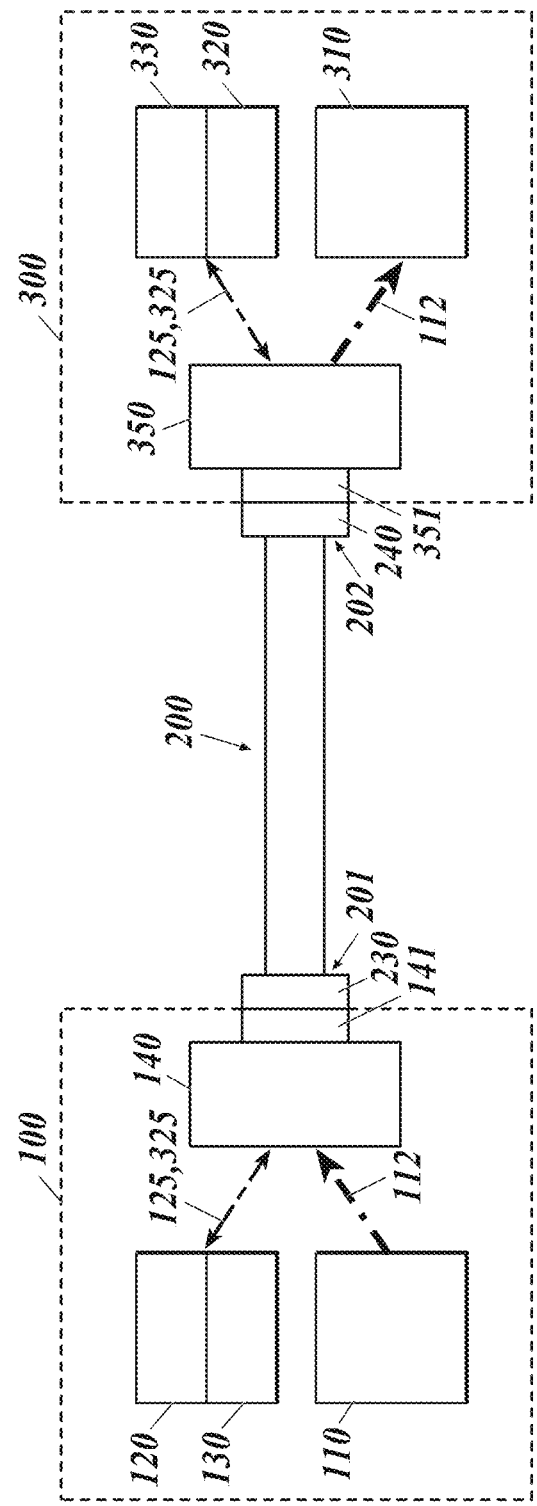
FIG. 3 is a block diagram of the optical fiber transmission system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
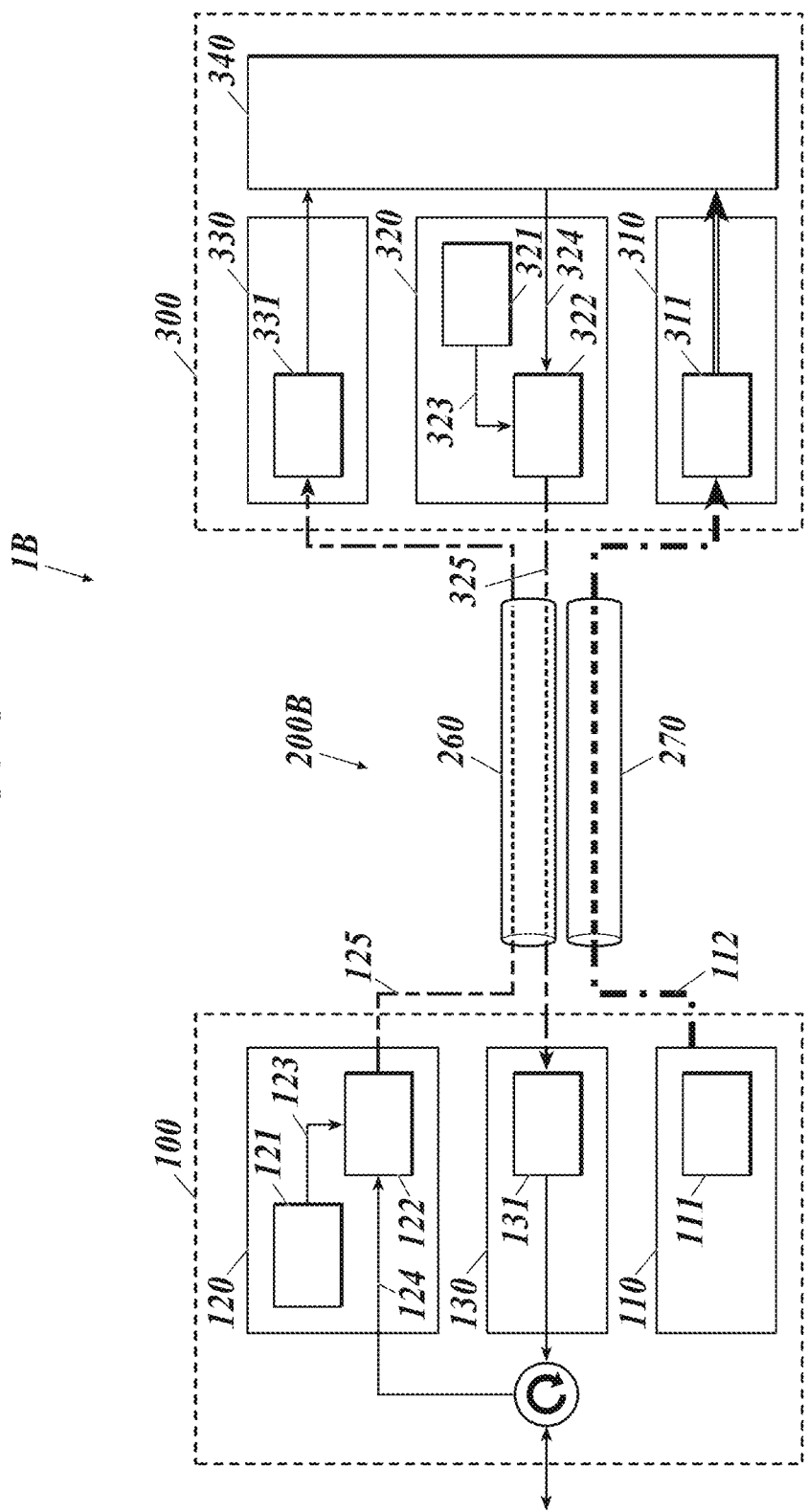
FIG. 4 is a block diagram of an optical fiber transmission system according to another embodiment of the present disclosure.

Like an optical fiber cable 200B of an optical fiber transmission system 1B shown in FIG. 4, an optical fiber 260 that transmits signal light and an optical fiber 270 that transmits feed light may be provided separately. Further, the optical fiber cable 200B may be composed of a plurality of optical fiber cables.

Third Embodiment

FIG. 5 is a block diagram of an optical fiber transmission system 1C according to a third embodiment. FIG. 6 is a schematic view to explain an optical fiber cable 200C of the optical fiber transmission system 1C. In FIG. 5, the same components as those described above are denoted by the same reference signs, and detailed descriptions thereof are omitted.

As shown in FIG. 5, the optical fiber transmission system 1C of the third embodiment includes a first data communication device 100C, an optical fiber cable 200C and a second data communication device 300C.

The first data communication device 100C includes three light supply devices 150 and a light supply controller 160.

The three light supply devices 150 include their respective semiconductor lasers 121C for signals.

The light supply controller 160 controls the three light supply devices 150 such that the light supply devices 150 modulate laser beams of the semiconductor lasers 121C to output three signal beams 125C having signals different from one another. The three signal beams 125C are not specifically limited as long as they have signals different from one another. The signals may be generated from single transmission data, for example. Like the transmitter 120 in the second embodiment, the light supply devices 150 may modulate the laser beams of their respective semiconductor lasers 121C with their respective modulators on the basis of transmission data, thereby outputting the modulated laser beams as the signal beams 125C.

The three signal beams 125C output from the three light supply devices 150 are output to the optical fiber cable 200C.

The optical fiber cable 200C includes an optical fiber 250C. The optical fiber 250C includes a core 210C that forms a transmission path of the three signal beams 125C and a cladding 220 around the core 210C.

As shown in FIG. 6, it is preferable that the core 210C contain a powder material (powder particles) P that diffuses light. This can facilitate diffusion of the signal beams 125C that are transmitted in the core 210C, and properly distribute the signal beams 125C to three light receiving devices 360 (photodiodes 331C for signals) of the second data communication device 300C so as to be received thereby. Between one end face of the optical fiber 250C and the three light supply devices 150 and between the other end face of the optical fiber 250C and the three light receiving devices 360, spaces are provided, but light input/output parts and optical connectors may be provided there as shown in FIG. 3.

The optical fiber 250C is configured to transmit the three signal beams 125C through the single core 210C or cladding 220. That is, the transmission path of the three signal beams 125 may be the cladding 220.

As shown in FIG. 5, the second data communication device 300C includes three light receiving devices 360 and a data processing unit 340C.

The three light receiving devices 360 receive signal beams 325C distributed thereto by the transmission of the three signal beams 125C from the three light supply devices 150 through the optical fiber cable 200C. That is, to the light receiving devices 360, the signal beams 325C containing the signal beams 125C having signals different from one another are transmitted. The photodiodes 331C of the respective light receiving devices 360 demodulate the signal beams 325C transmitted thereto to electric signals, and output the electric signals to the data processing unit 340C.

The data processing unit 340C performs, for example, signal separation with a matrix operation(s) on the basis of the signals input from the three light receiving devices 360, thereby obtaining the signals that the signal beams 125C output from the three light feeding devices 150 have. If these signals are generated from single data, the data processing unit 340C decodes this original data.

That is, the first data communication device 100C and the second data communication device 300C perform MIMO (multiple-input and multiple-output) communication by using the three light supply devices 150 and the three light receiving devices 360.

This can improve the communication speed as compared with a conventional case where a single light supply device and a single light receiving device are used.

Fourth Embodiment

FIG. 7 is a block diagram of an optical fiber transmission system according to a fourth embodiment. In FIG. 7, the same components as those described above are denoted by the same reference signs, and detailed descriptions thereof are omitted.

As shown in FIG. 7, an optical fiber transmission system 1D of the fourth embodiment is different from the optical fiber transmission system 10 of the third embodiment in that the beams to be transmitted are feed beams, and signals are superimposed thereon.

The optical fiber transmission system 1D includes a first data communication device 100D and a second data communication device 300D in addition to the optical fiber cable 200C.

The first data communication device 100D includes three light supply devices 150D and a light supply controller 160D.

The three light supply devices 150D include their respective semiconductor lasers 111D for power supply.

The light supply controller 160D controls the three light supply devices 150D such that the light supply devices 150D modulate laser beams of the semiconductor lasers 111D to output three feed beams 112D having signals different from one another. The three feed beams 112D are not specifically limited as long as signals different from one another are superimposed thereon. The signals may be generated from single transmission data, for example.

The three feed beams 112D output from the three light supply devices 150D are output to the core 210C of the optical fiber cable 200C.

The second data communication device 300D includes three light receiving devices 360D, an electric power combiner 370D and a data processing unit 340D.

The three light receiving devices 360D receive feed beams 312D distributed thereto by the transmission of the three feed beams 112D from the three light supply devices 150D through the optical fiber cable 200C. That is, to the light receiving devices 360D, the feed beams 312D containing the feed beams 112D with signals different from one another superimposed are transmitted. Photoelectric conversion elements 311D of the respective light receiving devices 360D convert the feed beams 312D transmitted thereto into electric powers.

The electric power combiner 370D combines the electric powers into which the three light receiving devices 360D (photoelectric conversion elements 311D) convert the feed beams 312D, and supplies the combined electric power to a load. The load may be a device(s) in the second data communication device 300D or an external device(s).

The data processing unit 340D demodulates the three feed beams 312D, thereby obtaining the three signals (pieces of information) superimposed thereon. Then, the data processing unit 340D performs, for example, signal separation with a matrix operation(s) on the basis of the obtained signals, thereby obtaining the signals superimposed on the feed beams 112D output from the three light supply devices 150D.

That is, the first data communication device 100D and the second data communication device 300D perform MIMO communication and power supply by using the three light supply devices 150D and the three light receiving devices 360D.

This can increase the power supply amount as compared with a case where a single light supply device and a single light receiving device are used, and also enables data communication without using a communication system.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

For example, in the third and fourth embodiments, three light supply devices and three light receiving devices are provided, but the number of light supply devices and the number of light receiving devices are not limited thereto. However, it is preferable that the numbers of these match.

INDUSTRIAL APPLICABILITY

As described above, an optical transmission system according to the present invention is useful for improving the communication speed as compared with a conventional one.

REFERENCE SIGNS LIST

1A Optical Fiber Transmission System (Optical Transmission System)
1 Optical Fiber Transmission System (Optical Transmission System)
1B Optical Fiber Transmission System (Optical Transmission System)
1C Optical Fiber Transmission System (Optical Transmission System)
1D Optical Fiber Transmission System (Optical Transmission System)
100 First Data Communication Device
100C First Data Communication Device
100D First Data Communication Device
111 Semiconductor Laser for Power Supply
111D Semiconductor Laser for Power Supply
112 Feed Light (Feed Beams)
112D Feed Beam
121 Semiconductor Laser for Signals
121C Semiconductor Laser for Signals
125 Signal Light (Signal Beams)
125C Signal Beam
150 Light Supply Device
150D Light Supply Device
160 Light Supply Controller
160D Light Supply Controller
200 Optical Fiber Cable
200A Optical Fiber Cable
200B Optical Fiber Cable
200C Optical Fiber Cable
210 Core
210C Core
250 Optical Fiber
250A Optical Fiber
250C Optical Fiber
300 Second Data Communication Device
300C Second Data Communication Device
300D Second Data Communication Device
311 Photoelectric Conversion Element
311D Photoelectric Conversion Element
312D Feed Beam
325 Signal Light (Signal Beams)
325C Signal Beam
331 Photodiode for Signals
331C Photodiode for Signals
340 Data Processing Unit
340C Data Processing Unit
340D Data Processing Unit
360 Light Receiving Device
360D Light Receiving Device
370D Electric Power Combiner
P Powder Material

The invention claimed is:

1. An optical transmission system comprising:
a plurality of light supply devices configured to output signal beams;
a plurality of light receiving devices configured to receive the signal beams; and
an optical fiber cable configured to transmit the signal beams,
wherein multiple-input and multiple-output (MIMO) communication is performed by the plurality of light receiving devices receiving the signal beams having signals different from one another, the signal beams being output from the plurality of light supply devices and transmitted through a single core or cladding of the optical fiber cable,
wherein the signal beams are feed beams, wherein the plurality of light supply devices is configured to output the feed beams with signals different from one another superimposed thereon by modulation, wherein the plurality of light receiving devices is configured to convert the feed beams transmitted thereto into electric powers, and wherein the optical transmission system further comprises:
- an electric power combiner configured to combine the electric powers obtained by the conversion by the plurality of light receiving devices; and
- a data processing unit configured to
  - receive the feed beams directly from the plurality of light receiving devices,
  - obtain signals superimposed on the feed beams received by the plurality of light receiving devices, and
  - based on the obtained signals, obtain the signals superimposed on the feed beams output by the plurality of light supply devices on the feed beams.

2. The optical transmission system according to claim 1, wherein the core or cladding of the optical fiber cable includes a powder material that diffuses light.

3. The optical transmission system according to claim 1, comprising:
- a first data communication device including the plurality of light supply devices; and
- a second data communication device including the plurality of light receiving devices, wherein the first and second data communication devices are configured to perform the MIMO communication by using the plurality of light supply devices and the plurality of light receiving devices.

4. The optical transmission system according to claim 3, wherein the data processing unit and the electric power combiner are provided in the second data communication device.

* * * * *